US 8,563,935 B2

(12) United States Patent
Teshigawara (10) Patent No.: US 8,563,935 B2
(45) Date of Patent: Oct. 22, 2013

(54) NUCLEAR MEDICINE IMAGING APPARATUS AND CONTROL METHOD

(71) Applicants: Kabushiki Kaisha Toshiba, Minato-ku (JP); Toshiba Medical Systems Corporation, Otawara (JP)

(72) Inventor: Manabu Teshigawara, Otawara (JP)

(73) Assignees: Kabushiki Kaisha Toshiba, Tokyo (JP); Toshiba Medical Systems Corporation, Otawara-shi (JP)

( * ) Notice: Subject to any disclaimer, the term of this patent is extended or adjusted under 35 U.S.C. 154(b) by 0 days.

(21) Appl. No.: 13/763,156

(22) Filed: Feb. 8, 2013

(65) Prior Publication Data
US 2013/0151800 A1 Jun. 13, 2013

Related U.S. Application Data

(63) Continuation of application No. PCT/JP2011/069717, filed on Aug. 31, 2011.

(30) Foreign Application Priority Data

Aug. 31, 2010 (JP) .................................. 2010-194338

(51) Int. Cl.
*G01T 1/10* (2006.01)
(52) U.S. Cl.
USPC .................................................... 250/363.01
(58) Field of Classification Search
USPC ..................... 250/362, 363.01–363.1
See application file for complete search history.

(56) References Cited

U.S. PATENT DOCUMENTS

| 3,936,636 | A | * | 2/1976 | Percival .................... 250/336.1 |
| 4,229,654 | A | * | 10/1980 | Arya et al. ................ 250/358.1 |
| 4,590,377 | A | * | 5/1986 | Lukens ..................... 250/361 R |
| 4,694,176 | A | * | 9/1987 | Horrocks ................... 250/362 |
| 2007/0096028 | A1 | | 5/2007 | Tanaka |
| 2011/0133091 | A1 | * | 6/2011 | Frach et al. ................. 250/362 |
| 2011/0309252 | A1 | * | 12/2011 | Moriyasu et al. ........... 250/362 |
| 2013/0037722 | A1 | * | 2/2013 | Yamaya et al. ............. 250/362 |

FOREIGN PATENT DOCUMENTS

| JP | 2007-107995 | 4/2007 |
| JP | 2008-089384 | 4/2008 |
| JP | 2010-185675 | 8/2010 |

OTHER PUBLICATIONS

International Search Report mailed Nov. 22, 2011 for PCT/JP2011/069717 filed Aug. 31, 2011 with English Translation.
International Written Opinion mailed Nov. 22, 2011 for PCT/JP2011/069717 filed Aug. 31, 2011.

* cited by examiner

*Primary Examiner* — Kiho Kim
(74) *Attorney, Agent, or Firm* — Oblon, Spivak, McClelland, Maier & Neustadt, L.L.P.

(57) ABSTRACT

According to one embodiment, a nuclear medicine imaging apparatus includes a counting information collection unit, a determination unit, and a discarding unit. The counting information collection unit collects counting information including detection time of a gamma ray from a counting result output by a detector for counting light derived from a gamma ray, and stores the counting information in a buffer. The determination unit determines whether the volume of the counting information stored in the buffer exceeds a threshold. The discarding unit, in a case that the determination unit determines that the volume exceeds the threshold, intermittently discards, in chronological order, counting information whose detection time is within longer duration than predetermined duration used for generating two pieces of counting information obtained by counting pair annihilation gamma rays nearly coincidentally as coincidence counting information among the counting information collected from the detector.

4 Claims, 10 Drawing Sheets

| MODULE ID | SCINTILLATOR NUMBER | ENERGY VALUE | DETECTION TIME |
|---|---|---|---|
| | P11 | E11 | T11 |
| | P12 | E12 | T12 |
| D1 | P13 | E13 | T13 |
| | ⋮ | ⋮ | ⋮ |
| | P21 | E21 | T21 |
| | P22 | E22 | T22 |
| D2 | P23 | E23 | T23 |
| | ⋮ | ⋮ | ⋮ |
| | P31 | E31 | T31 |
| | P32 | E32 | T32 |
| D3 | P33 | E33 | T33 |
| | ⋮ | ⋮ | ⋮ |
| ⋮ | ⋮ | ⋮ | ⋮ |

FIG.8

| COUNTING INFORMATION A | | | COUNTING INFORMATION B | | |
|---|---|---|---|---|---|
| SCINTILLATOR NUMBER | ENERGY VALUE | DETECTION TIME | SCINTILLATOR NUMBER | ENERGY VALUE | DETECTION TIME |
| P11 | E11 | T11 | P22 | E22 | T22 |
| P12 | E12 | T12 | P32 | E32 | T32 |
| P13 | E13 | T13 | P33 | E33 | T33 |
| ⋮ | ⋮ | ⋮ | ⋮ | ⋮ | ⋮ |

NUCLEAR MEDICINE IMAGING APPARATUS AND CONTROL METHOD

CROSS-REFERENCE TO RELATED APPLICATIONS

This application is a continuation of PCT international application Ser. No. PCT/JP2011/069717 filed on Aug. 31, 2011 which designates the United States, and which claims the benefit of priority from Japanese Patent Application No. 2010-194338, filed on Aug. 31, 2010; the entire contents of which are incorporated herein by reference.

FIELD

Embodiments described herein relate generally to a nuclear medicine imaging apparatus and a control method.

BACKGROUND

Conventionally, positron emission computed tomography (PET) apparatuses are known as nuclear medicine imaging apparatuses that can make a functional diagnosis in body tissues of a subject.

Specifically, in a PET examination, a compound labeled with a positron-emitting radionuclide is administered to the subject. Such a PET apparatus coincidentally counts a pair of gamma rays (pair annihilation gamma rays) of 511 keV emitted in approximately opposite directions when a positron emitted from the labeled compound binds to an electron and annihilates by using a photon counting detector arranged around the subject. The PET apparatus then performs calculation processing on data of the gamma rays coincidentally counted (coincidence counting information) to reconstruct a PET image.

More specifically, the PET apparatus collects counting information including the detection position of the gamma rays, the detection time (e.g., clock time of detection) of the gamma rays, and the energy value of the gamma rays from counting results output by the detector. The nuclear medicine imaging apparatus then generates a combination of two pieces of counting information whose detection time is within predetermined duration as the coincidence counting information obtained by counting pair annihilation gamma rays nearly coincidentally. The PET apparatus then reconstructs a PET image indicating distribution of the labeled compound in the way that the labeled compound emitting the positron is present on a line connecting the detection positions included in each piece of the counting information constituting the coincidence counting information.

Furthermore, in recent years, PET-CT apparatuses in which a PET apparatus and an X-ray computed tomography (CT) apparatus that supplies form information are integrated have been in practical use.

As a result of supplement of the counting information in excess of the processing capacity of the PET apparatus, the counting information may be discarded.

DETAILED DESCRIPTION

First Embodiment

According to one embodiment, a nuclear medicine imaging apparatus includes a storing unit, a determination unit, and a discarding unit. The storing unit is configured to collect counting information including detection time of a gamma ray from a counting result output by a detector for counting light derived from a gamma ray, and to store the counting information in a predetermined storage unit. The determination unit is configured to determine whether a volume of the counting information stored in the predetermined storage unit exceeds a threshold. The discarding unit is configured to, in a case where the determination unit determines that the volume exceeds the threshold, intermittently discard, in chronological order, counting information whose detection time is within longer duration than predetermined duration used for generating two pieces of counting information obtained by counting pair annihilation gamma rays nearly coincidentally as coincidence counting information among the counting information collected from the detector. Exemplary embodiments of a nuclear medicine imaging apparatus are described below in greater detail with reference to the accompanying drawings. In the description below, while the nuclear medicine imaging apparatus is explained by using a PET-CT apparatus as an example, it is not limited thereto. Alternatively, the nuclear medicine imaging apparatus may be a PET-magnetic resonance imaging (MRI) apparatus or a PET apparatus, for example.

Figure 1:
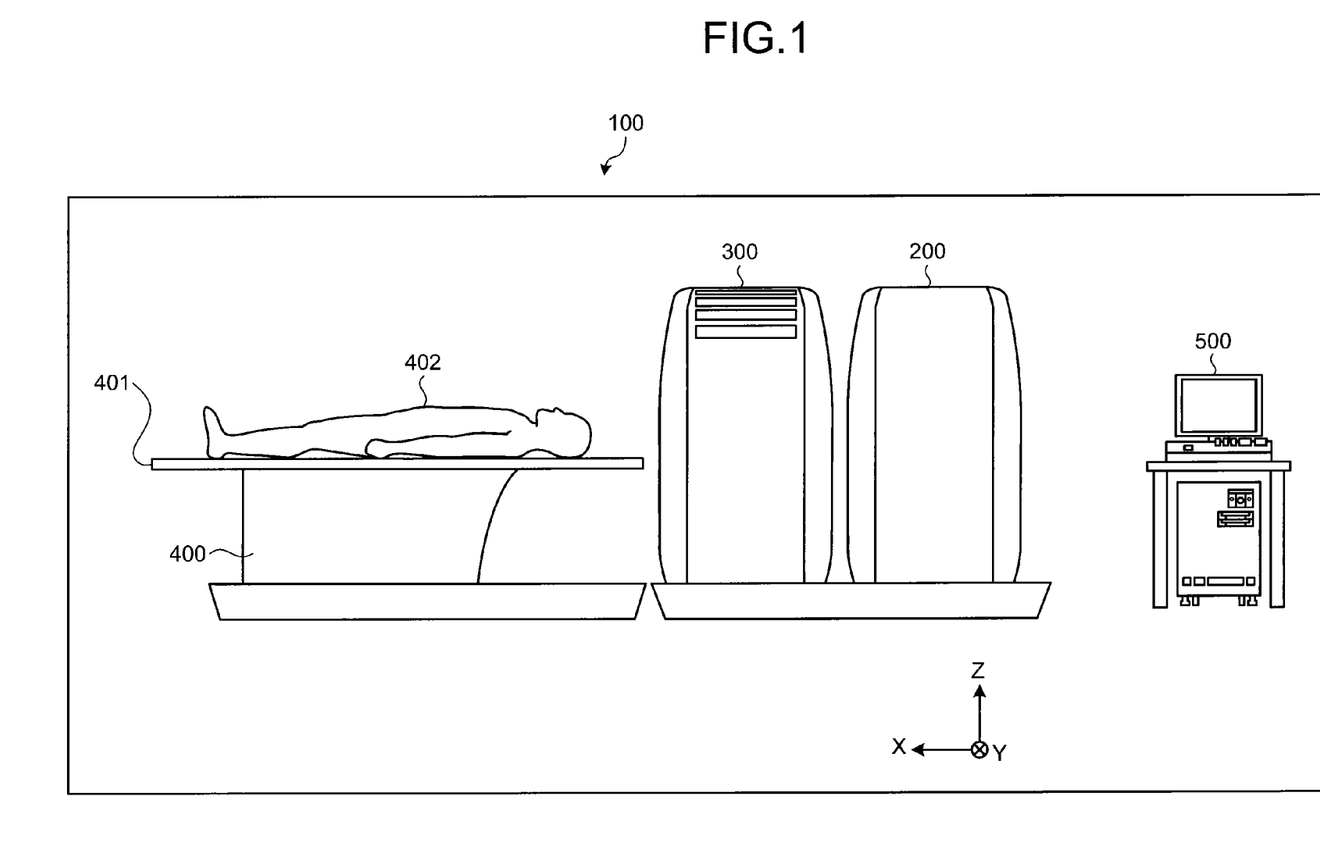
FIG. 1 is a diagram illustrating a whole image of a configuration of a PET-CT apparatus according to a first embodiment.

FIG. 1 is a diagram illustrating a whole image of a configuration of the PET-CT apparatus according to the first embodiment. In FIG. 1, 100 denotes the PET-CT apparatus, 200 denotes a PET scanner, 300 denotes an X-ray CT scanner, 400 denotes a bed, 401 denotes a tabletop on which a subject is lying, and 402 denotes a subject. As illustrated in FIG. 1, the PET-CT apparatus 100 includes the PET scanner 200, the X-ray CT scanner 300, the bed 400, and a console device 500. The X-direction in FIG. 1 represents a direction of the body axis of the subject 402 lying on the tabletop 401 illustrated in FIG. 1. The Y-direction represents a direction orthogonal to the X-direction on a horizontal plane. The Z-direction represents a vertical direction.

The bed 400 includes the tabletop 401 on which the subject 402 is lying. Furthermore, the bed 400 includes a bed control unit, which is not illustrated in FIG. 1, for moving the tabletop 401. The bed control unit is controlled by the console device 500, and moves the subject 402 lying on the tabletop 401 into an imaging bore of the PET-CT apparatus 100.

The PET scanner 200 includes a plurality of detectors 210 that detect gamma rays for reconstructing a PET image. The detectors 210 are arranged in a ring shape around the body axis of the subject 402. The PET scanner 200, from outside of the body of the subject 402 lying on the tabletop 401, detects a pair of gamma rays (pair annihilation gamma rays) emitted from a labeled compound introduced into body tissues of the subject 402, for example.

Specifically, every time the detector 210 detects the gamma rays, the PET scanner 200 collects the detection position indicating a position of the detector 210 that detects the gamma rays, the energy value at the time when the gamma rays are incident on the detector 210, and the detection time at which the detector 210 detects the gamma rays. The information collected by the PET scanner 200 is also referred to as "counting information". In the first embodiment, an explanation is made of the case where, as the counting information, clock time of detection (absolute time) is collected as the detection time of the gamma rays. Alternatively, in the first embodiment, as the counting information, elapsed time (relative time) since the start of PET image capturing may be collected as the detection time of the gamma rays, for example.

A relationship between the gamma rays detected by the detectors 210 and a pair of gamma rays emitted from the labeled compound introduced into the body tissues of the subject 402 will now be described. When a pair of gamma rays is emitted from the labeled compound, for example, the detector 210 detects one of the pair of gamma rays alone, and the other of the gamma rays is detected by another detector 210. A line connecting two detection positions at which a pair of gamma rays (pair annihilation gamma rays) is counted coincidentally is referred to as a line of response (LOR).

The labeled compound is, for example, 18F-labeled deoxyglucose labeled with "18F (fluorine)" that is a positron-emitting radionuclide. The labeled compound is administered to the subject 402 prior to measurement performed by the PET-CT apparatus 100. However, the labeled compound is not limited to the 18F-labeled deoxyglucose, and may be an arbitral labeled compound.

The X-ray CT scanner 300 includes an X-ray tube 301 that emits X-rays for reconstructing an X-ray CT image and an X-ray detector 302 that detects the X-rays emitted by the X-ray tube 301. In the X-ray CT scanner 300, the X-ray tube 301 irradiates the subject 402 with the X-rays, and the X-ray detector 302 detects the X-rays passing through the subject 402. Specifically, the X-ray tube 301 emits the X-rays, and the X-ray detector 302 detects the X-rays while the X-ray CT scanner 300 is rotating about the body axis of the subject 402. In other words, the X-ray CT scanner 300 irradiates the subject 402 with the X-rays in multi-directions, and detects the attenuated X-rays absorbed in the subject 402 by passing through the subject 402 while being rotating about the body axis of the subject 402. Data generated by performing amplification processing, AD conversion processing on the X-rays, and the like detected by the X-ray detector 302 is also referred to as "X-ray projection data". The X-ray CT scanner 300 collects the X-ray projection data and the detection position at which the X-rays used for generating the X-ray projection data are detected.

Figure 2:
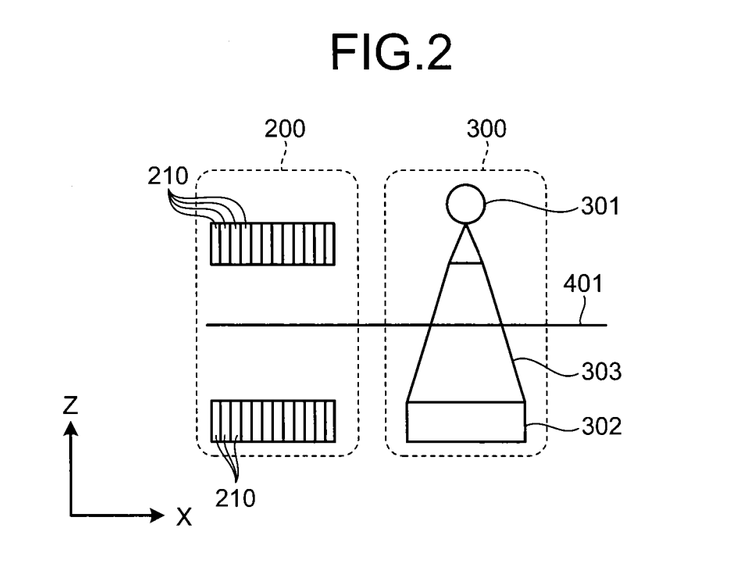
FIG. 2 is a diagram of an example of a relationship between a PET scanner and an X-ray CT scanner according to the first embodiment.

FIG. 2 is a diagram of an example of a relationship between the PET scanner and the X-ray CT scanner according to the first embodiment. FIG. 2 is a sectional view of the PET scanner 200 and the X-ray CT scanner 300 viewed in the Y-axis direction. In FIG. 2, 200 denotes the PET scanner, 210 denotes the detectors, 300 denotes the X-ray CT scanner, 301 denotes the X-ray tube, 302 denotes the X-ray detector, and 303 denotes X-rays emitted by the X-ray tube 301. In FIG. 2, the tabletop 401 is illustrated in addition to the PET scanner 200 and the X-ray CT scanner 300 as a matter of convenience for explanation.

As illustrated in FIG. 2, in the PET scanner 200, a plurality of detectors 210 are arranged in the X-axis direction. Furthermore, the detectors 210 are arranged in a manner surrounding the body axis of the subject 402 in a ring shape. As illustrated in FIG. 2, the X-ray CT scanner 300 includes the X-ray tube 301 and the X-ray detector 302. The X-ray tube 301 and the X-ray detector 302 are arranged at positions facing each other with the tabletop 401 on which the subject 402 is lying at the time of measurement interposed therebetween.

Figure 3:
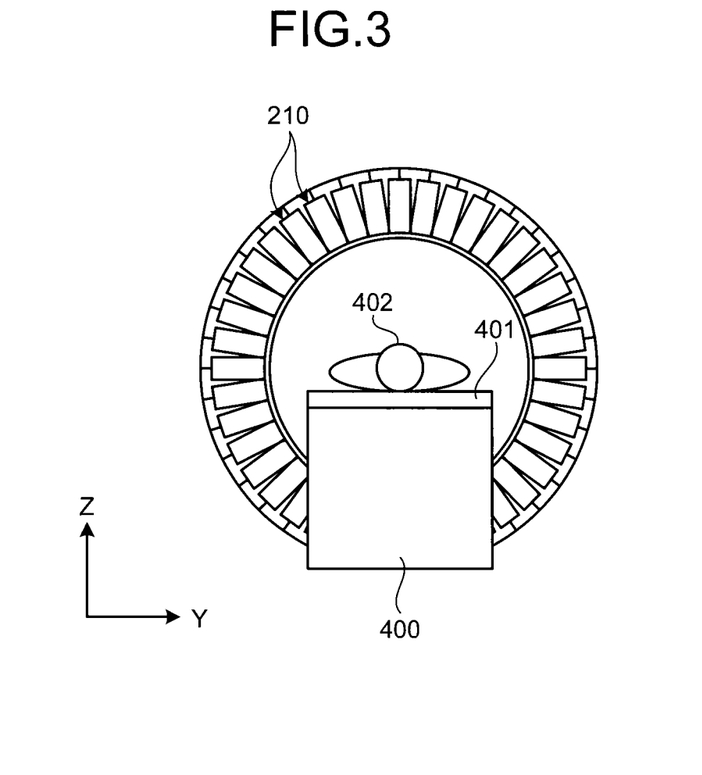
FIG. 3 is a diagram of a configuration of the PET scanner according to the first embodiment.

FIG. 3 is a diagram of a configuration of the PET scanner according to the first embodiment. In FIG. 3, 400 denotes the bed, 401 denotes the tabletop, 402 denotes the subject, and 210 denotes the detectors. FIG. 3 is a sectional view of the PET scanner viewed in the X-axis direction. In FIG. 3, the subject 402, the bed 400, and the tabletop 401 are illustrated in addition to the PET scanner 200 as a matter of convenience for explanation.

As illustrated in FIG. 3, in the PET scanner 200, a plurality of detectors 210 are arranged in a manner surrounding the subject 402 in a ring shape. A photon counting detector, for example, is employed as the detector 210.

Figure 4:
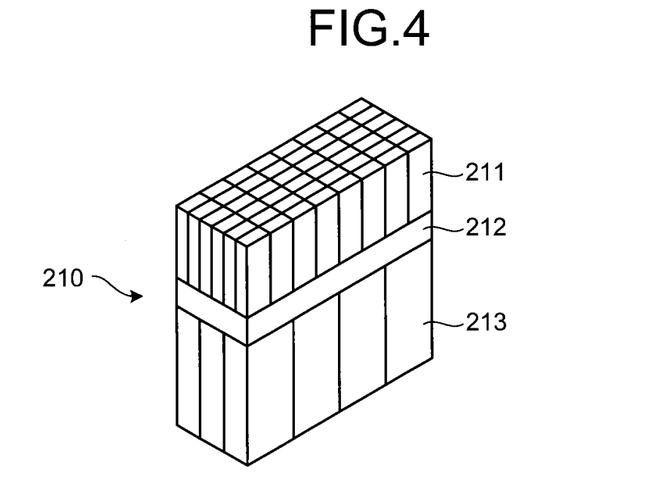
FIG. 4 is a diagram of an exemplary structure of a detector according to the first embodiment.

FIG. 4 is a diagram of an exemplary structure of the detector according to the first embodiment. In FIG. 4, 211 denotes scintillators, 212 denotes a light guide, and 213 denotes photo multiplier tubes (PMTS).

As illustrated in FIG. 4, the detector 210 that counts light derived from the gamma rays includes the scintillators 211, the light guide 212, and the PMTS 213. The scintillator 211 converts the gamma rays emitted from the subject 402 and incident on the detector 210 into visible light, and outputs the visible light. The scintillator 211 is formed of, for example, NaI or BGO that converts gamma rays into visible light. Furthermore, as illustrated in FIG. 4, the scintillators 211 are arranged two-dimensionally. The visible light output by the scintillator 211 is also referred to as "scintillation light". The light guide 212 transmits the visible light output by the scintillator 211 to the PMT 213. The light guide 212 is formed of, for example, a plastic material having excellent optical transparency. The PMT 213 receives the visible light output by the scintillator 211 via the light guide 212, and converts the visible light thus received into an electrical signal. The PMT 213 is provided in plurality.

The PMT 213 will now be described in greater detail. The PMT 213 includes a photocathode that receives the scintillation light and generates a photoelectron, a multi-stage dynode that supplies an electric field in which the photoelectron generated by the photocathode is accelerated, and an anode from which an electron flows out. The electron released from the photocathode by the photoelectric effect is accelerated toward the dynode, and collides with the surface of the dynode to knock out a plurality of electrons. The phenomenon in which the electrons are knocked out on the surface of the dynode is repeated over the multi-stage dynode, thereby increasing the number of electrons in an avalanche manner.

If a piece of scintillation light is received, for example, the anode outputs approximately one million electrons. The number of electrons obtained from the anode in the case where a piece of scintillation light is received is also referred to as "gain of the PMT". In this case, the gain of the PMT 213 is "millionfold". Note that, when the number of electrons is increased in an avalanche manner, voltage of 1000V or higher is generally applied between the dynode and the anode.

Thus, in the detector 210, the scintillator 211 converts the gamma rays into visible light, and the PMT 213 converts the visible light into an electrical signal. As a result, the detector 210 detects the gamma rays emitted from the subject 402.

Figure 5:
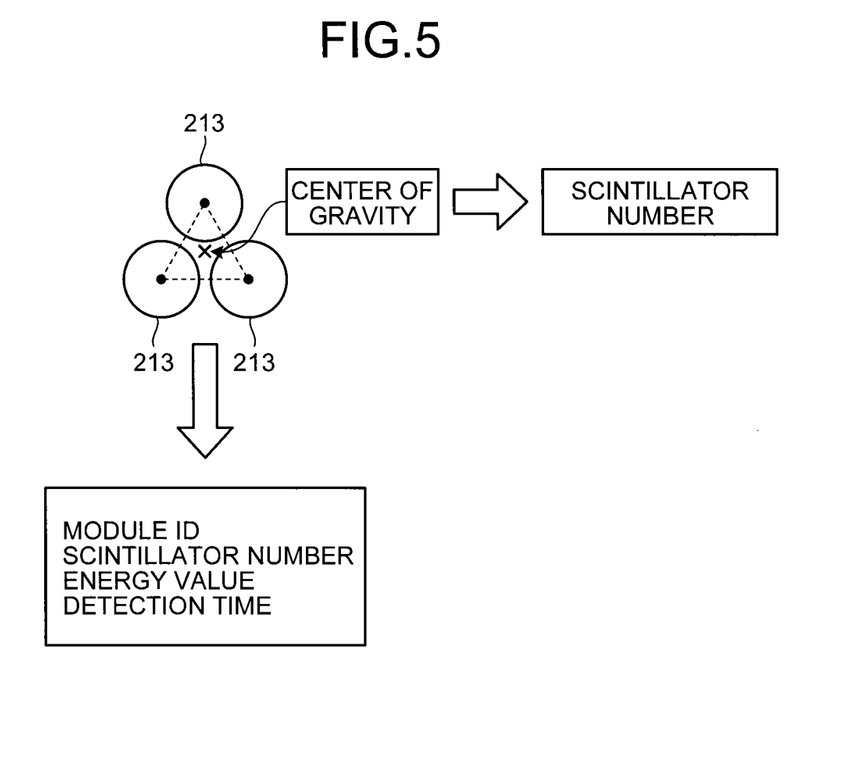
FIG. 5 is a diagram of information detected by an Anger-type detector according to the first embodiment.

As described above, every time the detector 210 detects the gamma rays, the PET scanner 200 collects the detection position, the energy value, and the detection time as the counting results of the detector 210. A simple explanation will be made of an example of processing for calculating the detection position and the energy value in the case where the detectors 210 adjacent to one another detect the gamma rays coincidentally with reference to FIG. 5. FIG. 5 is a diagram of information detected by an Anger-type detector according to the first embodiment.

The PET scanner 200 performs Anger-type position calculation processing to determine the detection position, for example. Furthermore, if the PMT 213 is a position-detecting PMT, for example, the PET scanner 200 collects the detection position by using the position-detecting PMT 213. As illustrated in FIG. 5, an explanation will be made of the case where three PMTs 213 convert the scintillation light into electrical signals, and output the electrical signals at the same timing. In this case, the PET scanner 200 acquires the positions of the PMTs 213 that output the electrical signals coincidentally, and acquires the energy value of each of the electrical signals output from the PMTs 213 that output the electrical signals coincidentally. The PET scanner 200 then calculates the position of the center of gravity from the energy values thus acquired, and specifies the scintillator 211 corresponding to the position of the center of gravity thus calculated. Furthermore, the PET scanner 200 integrates the energy values of the electrical signals output by the PMTs 213 that have converted the scintillation light into the electrical signals and output the electrical signals at the same timing, and determines the energy value obtained as a result of the integration to be the energy value of the gamma rays incident on the detector 210.

As illustrated in FIG. 5, every time the detector 210 detects the gamma rays, the PET scanner 200 collects a "scintillator number" that identifies the scintillator 211 uniquely, an "energy value", and "detection time". The example illustrated in FIG. 5 depicts the case where a "module ID" that is information uniquely identifying the detector 210 provided in plurality is also output in addition to the "scintillator number", the "energy value", and the "detection time".

The detector 210 collects the detection time with an accuracy of $10^{-10}$ second to $10^{-22}$ second, for example.

A simple explanation will be made of a processing flow in the case where the PET-CT apparatus 100 according to the first embodiment reconstructs a PET image and an X-ray CT image. In the PET-CT apparatus 100, the PET scanner 200 and the X-ray CT scanner 300 move from left to right, or the tabletop 401 and the bed 400 move from right to left in FIG. 1 and FIG. 2. As a result, the X-ray CT scanner 300 collects the X-ray projection data, and thereafter the PET scanner 200 collects the counting information. Subsequently, the console device 500 reconstructs a PET image and an X-ray CT image based on the information thus collected. However, the processing flow is not limited thereto, and the PET scanner 200 and the X-ray CT scanner 300 may move from right to left in FIG. 1 and FIG. 2.

Figure 6:
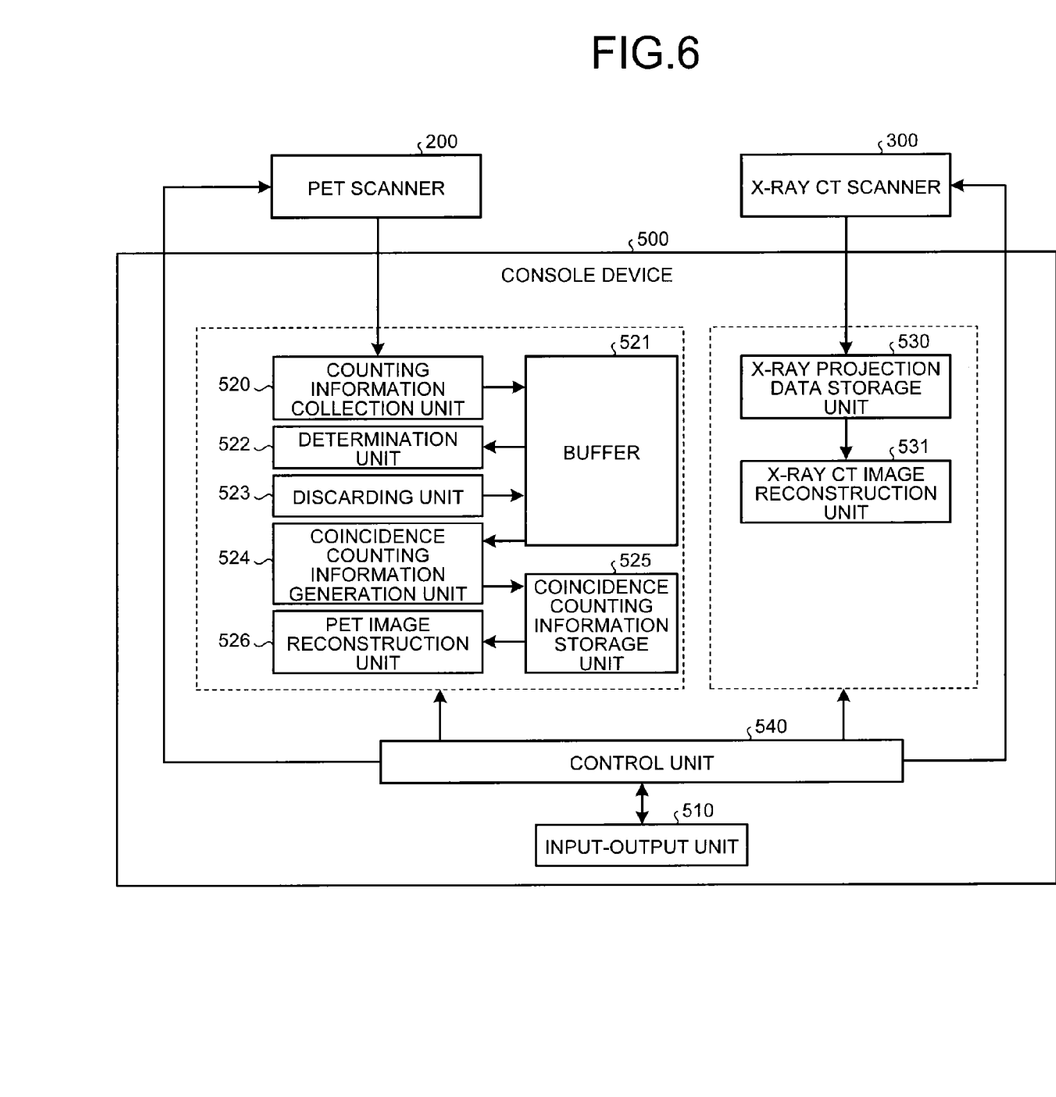
FIG. 6 is a block diagram of an exemplary configuration of a console device according to the first embodiment.

FIG. 6 is a block diagram of an exemplary configuration of the console device according to the first embodiment. The console device 500 reconstructs an X-ray CT image based on the information collected by the X-ray CT scanner 300. Furthermore, the console device 500 generates coincidence counting information by using the counting information collected by the PET scanner 200, and reconstructs a PET image based on the coincidence counting information thus generated. In the description below, the processing for reconstructing a PET image and the processing for reconstructing an X-ray CT image by the console device 500 may be performed by using an arbitrary method, and an explanation thereof will be made succinctly.

In the example illustrated in FIG. 6, the PET scanner 200 and the X-ray CT scanner 300 are illustrated in addition to the console device 500 as a matter of convenience for explanation. In the example illustrated in FIG. 6, the console device 500 includes an input-output unit 510 and a control unit 540. In addition, in the example illustrated in FIG. 6, the console device 500 includes an X-ray projection data storage unit 530 and an X-ray CT image reconstruction unit 531 so as to reconstruct an X-ray CT image. Furthermore, in the example illustrated in FIG. 6, the console device 500 includes a counting information collection unit 520, a buffer 521, a determination unit 522, a discarding unit 523, a coincidence counting information generation unit 524, a coincidence counting information storage unit 525, and a PET image reconstruction unit 526 so as to reconstruct a PET image. In the first embodiment, an explanation is made of the case where one console device 500 reconstructs an X-ray CT image and a PET image. However, the first embodiment can be applied to the case where reconstruction of an X-ray CT image and reconstruction of a PET image are performed in different console devices.

The input-output unit 510 is connected to the control unit 540. The input-output unit 510 receives various types of instructions from a user who uses the PET-CT apparatus 100, and transmits the various types of instructions thus received to the control unit 540. Furthermore, the input-output unit 510 receives information from the control unit 540, and outputs the information thus received to the user. The input-output unit 510 is, for example, a keyboard, a mouse, a microphone, a monitor, and a speaker. Explanations of details of the information and the instructions received by the input-output unit 510 and a detail of the information output by the input-output unit 510 are omitted herein. The explanations thereof will be made when each unit related thereto is described.

The control unit 540 includes an internal memory that stores therein a program specifying various types of processing processes and the like, and controls various types of processing. For example, the control unit 540 is an electronic circuit, such as an application specific integrated circuit (ASIC), a field programmable gate array (FPGA), a central processing unit (CPU), and a micro processing unit (MPU). The control unit 540 controls the whole processing of the PET-CT apparatus 100. Specifically, the control unit 540 controls the PET scanner 200 and the X-ray CT scanner 300, thereby controlling radiography performed by the PET-CT apparatus 100. Furthermore, the control unit 540 controls the reconstruction processing of a PET image and the reconstruction processing of an X-ray CT image in the console device 500. Moreover, the control unit 540 displays a PET image, an X-ray CT image, a superimposed image of a PET image and an X-ray CT image, or the like on the monitor of the input-output unit 510.

The X-ray projection data storage unit 530 stores therein X-ray projection data transmitted from the X-ray CT scanner 300. The X-ray CT image reconstruction unit 531 performs back projection processing on the X-ray projection data stored in the X-ray projection data storage unit 530 by the filtered back projection (FBP) method, for example, thereby reconstructing an X-ray CT image.

The counting information collection unit 520 collects counting information including the detection time (time of detection) of the gamma rays from the counting results output by the detectors 210, and stores the counting information in the buffer 521. In other words, the counting information collection unit 520 sequentially receives the counting information collected by the PET scanner 200, and stores the counting information thus received in the buffer 521. The counting information collection unit 520 may be provided in the PET scanner 200. The counting information collection unit 520 is also referred to as a "storing unit".

Figure 7:
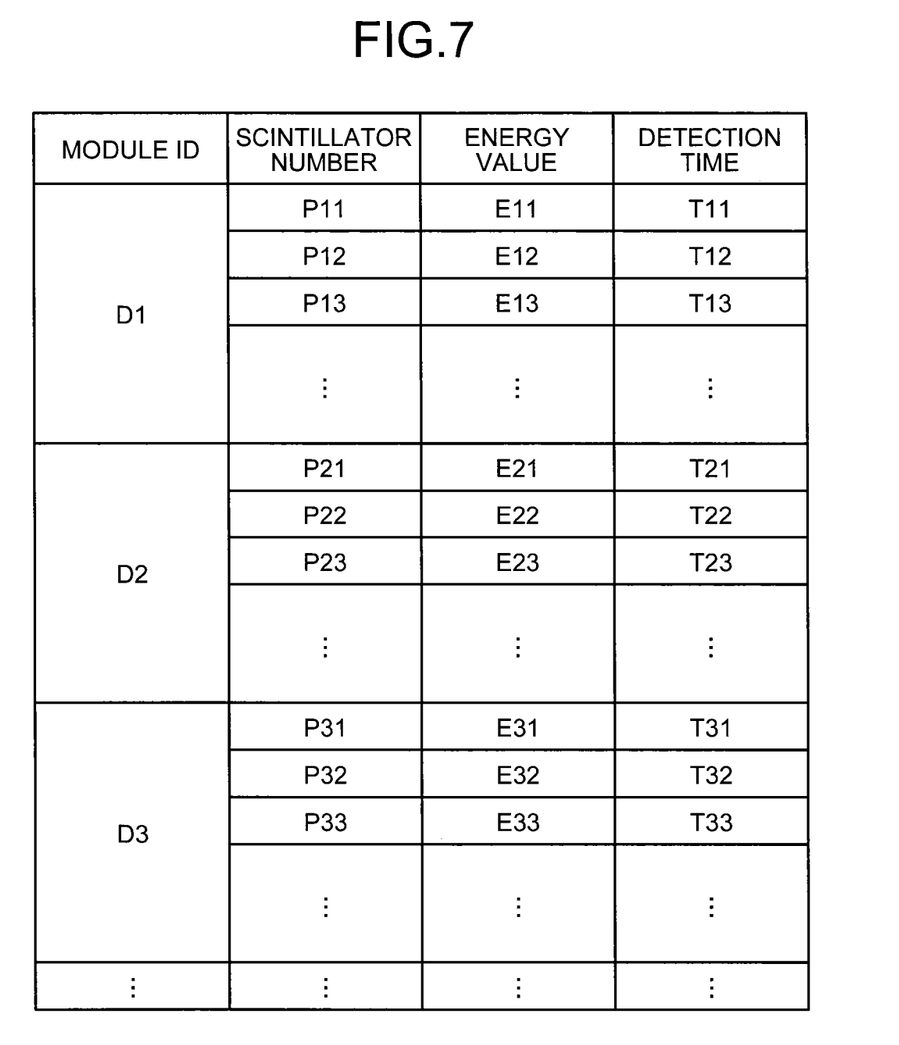
FIG. 7 is a diagram of an example of counting information stored in a buffer according to the first embodiment.

The buffer 521 stores therein the counting information stored by the counting information collection unit 520. For example, the buffer 521 is a semiconductor memory device, such as a random access memory (RAM) and a flash memory, or a storage device, such as a hard disk and an optical disk. FIG. 7 is a diagram of an example of the counting information stored in the buffer according to the first embodiment.

In the example illustrated in FIG. 7, the buffer 521 stores therein the "scintillator number", the "energy value", and the "detection time" in a manner corresponding to the "module ID". The "module ID" is the information uniquely identifying the detector 210 provided in plurality.

In the example illustrated in FIG. 7, the buffer 521 stores therein, in a manner corresponding to a module ID "D1", a scintillator number "P11", an energy value "E11", and detection time "T11", and a scintillator number "P12", an energy value "E12", and detection time "T12". In other words, the buffer 521 stores therein the fact that the scintillator "P11" detects gamma rays of the energy value "E11" at the detection time "T11" in the detector "D1", and the fact that the scintillator "P12" detects gamma rays of the energy value "E12" at the detection time "T12" in the detector "D1". Furthermore, the buffer 521 stores therein the counting information based on counting results output by other detectors 210 in the same manner as described above.

Referring back to FIG. 6, the coincidence counting information generation unit 524 generates a combination of two pieces of counting information whose difference in detection time (time of detection) is within predetermined duration (time window) among the counting information stored in the buffer 521 as coincidence counting information obtained by counting pair annihilation gamma rays nearly coincidentally.

Specifically, the coincidence counting information generation unit 524 generates the coincidence counting information based on conditions of coincidence counting information generation specified by an operator. The conditions of coincidence counting information generation include a time window, for example. The time window indicates an upper limit of difference between two detection times in the case where a pair of gamma rays are both counted.

For a pair of gamma rays emitted coincidentally from a positron-emitting radionuclide, the detection times of the gamma rays each included in the pair of gamma rays are the same time, or difference between the two detection times is small even if the detection times are not the same time. As a result, the coincidence counting information generation unit 524 uses the time window to prevent false coincidence counting information from being generated.

For example, an explanation will be made of the case where the coincidence counting information generation unit 524 generates the coincidence counting information by using a time window of "10 nanoseconds". In this case, the coincidence counting information generation unit 524 refers to the "detection time (T)" of each "module ID", and searches for a combination of the counting information whose difference between two detection times is within a "time window of 10 nanoseconds" among the modules.

Searching for a combination in which the detection time is within the time window is also referred to as "coincidence finding". A list of the coincidence counting information generated by the coincidence counting information generation unit 524 is also referred to as a "coincidence list".

The coincidence counting information generation unit 524 may use an energy window together with the time window to generate the coincidence counting information.

The counting information searched by the coincidence counting information generation unit 524 so as to generate the coincidence counting information is sequentially discarded from the buffer 521 after the generation of the coincidence counting information.

Figure 8:
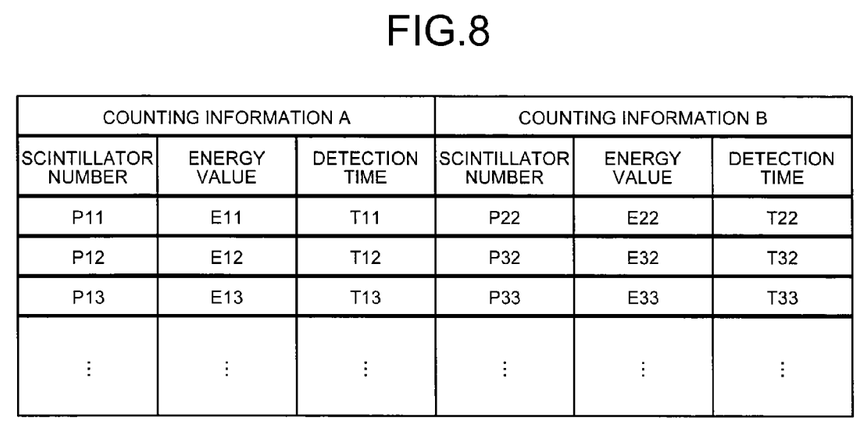
FIG. 8 is a diagram of an example of coincidence counting information stored in a coincidence counting information storage unit according to the first embodiment.

The coincidence counting information generation unit 524 then stores the coincidence counting information thus generated in the coincidence counting information storage unit 525. For example, the coincidence counting information storage unit 525 is a semiconductor memory device, such as a RAM and a flash memory, or a storage device, such as a hard disk and an optical disk. FIG. 8 is a diagram of an example of the coincidence counting information stored in the coincidence counting information storage unit according to the first embodiment.

As illustrated in FIG. 8, the coincidence counting information storage unit 525 stores therein a combination of two pieces of counting information. In FIG. 8, two pieces of counting information included in the combinations of the counting information are referred to as "counting information A" and "counting information B", respectively, as a matter of convenience for description. In the example illustrated in FIG. 8, the coincidence counting information storage unit 525 stores therein a combination of the counting information A including the scintillator number "P11", the energy value "E11", and the detection time "T11", and of the counting information B including a scintillator number "P22", an energy value "E22", and detection time "T22". In other words, the coincidence counting information storage unit 525 stores therein the fact that the scintillator "P11" detects one of a pair of gamma rays emitted from a positron-emitting radionuclide at the detection time "T11". In addition, the coincidence counting information storage unit 525 stores therein the fact that the scintillator "P22" detects the other of the pair of gamma rays emitted from the positron-emitting radionuclide at the detection time "T22".

Referring back to FIG. 6, the PET image reconstruction unit 526 reads the coincidence counting information generated by the coincidence counting information generation unit 524 from the coincidence counting information storage unit 525, and uses the coincidence counting information thus read to reconstruct a PET image. Specifically, the PET image reconstruction unit 526 considers the coincidence counting information as projection data (sinogram) of the gamma rays, and reconstructs the PET image from the projection data of the gamma rays by using a successive approximation method. The successive approximation methods include a maximum likelihood expectation maximization (MLEM) method, and an ordered subset MLEM (OSEM) method in which the convergence time is significantly reduced by improving the algorithm of the MLEM method.

As described above, in the PET-CT apparatus 100 according to the first embodiment, the generation processing of the coincidence counting information that has been performed by hardware in the PET scanner 200 conventionally is performed in the console device 500. In other words, while the coincidence counting information has been conventionally generated by using duration set by the hardware, the PET-CT apparatus 100 according to the first embodiment, for example, can use duration capable of being set arbitrarily by software to generate the coincidence counting information. As a result, if the operator desires to change the conditions of coincidence counting information generation, for example, the PET-CT apparatus 100 according to the first embodiment can respond flexibly.

At a high counting rate, however, when the coincidence counting information is generated, the counting information may overflow from the buffer 521. In such a case, a batch of counting information collected within a certain time period is discarded. As a result, the number of pieces of coincidence counting information becomes insufficient, thereby deteriorating the image quality of the PET image.

Therefore, the PET-CT apparatus 100 according to the first embodiment performs processes on the determination unit 522 and the discarding unit 523 illustrated in FIG. 6.

In other words, the determination unit 522 and the discarding unit 523, in consort with each other, determine whether the volume of the counting information stored in the buffer 521 exceeds a threshold, and if it is determined that the volume exceeds the threshold, discard the counting information from the buffer 521 so as to suppress deterioration in the image quality of the PET image.

First, the determination unit 522 determines whether the volume of the counting information stored in the buffer 521 exceeds the threshold. An explanation will be made of the case where the capacity of the buffer 521 is 10 M bytes and the threshold is 8 M bytes, for example. In this case, the determination unit 522 recognizes the volume of the counting information stored in the buffer 521 at an arbitrary determination timing. If the volume of the counting information thus recognized exceeds 8 M bytes, the determination unit 522 determines that the volume exceeds the threshold. By contrast, if the volume does not exceed 8 M bytes, the determination unit 522 determines that the volume does not exceed the threshold. The arbitrary determination timing is set by the user in advance, for example.

If the determination unit 522 determines that the volume exceeds the threshold, the discarding unit 523 intermittently discards counting information whose detection time is within longer duration than the duration (time window) described above in chronological order among the counting information collected from the detector 210 (that is, among the counting information collected by the counting information collection unit 520). In the conditions of coincidence counting information generation, if 10 nanoseconds is set as the time window, for example, the duration used for the processing in the discarding unit 523 is set to duration longer than 10 nanoseconds. The duration used for the processing in the discarding unit 523 is hereinafter referred to as "set duration".

Furthermore, the set duration is set to shorter duration than the duration required to collect the counting information for generating the coincidence counting information used for reconstruction of a PET image. The set duration is set on the millisecond time scale, for example.

Figure 9A:
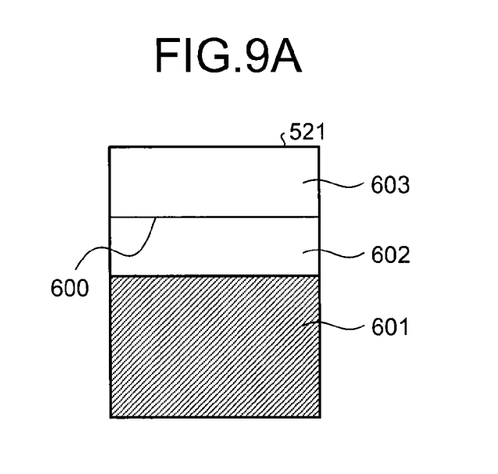
FIG. 9A is a diagram (1) for explaining a discarding unit and a determination unit.
Figure 9B:
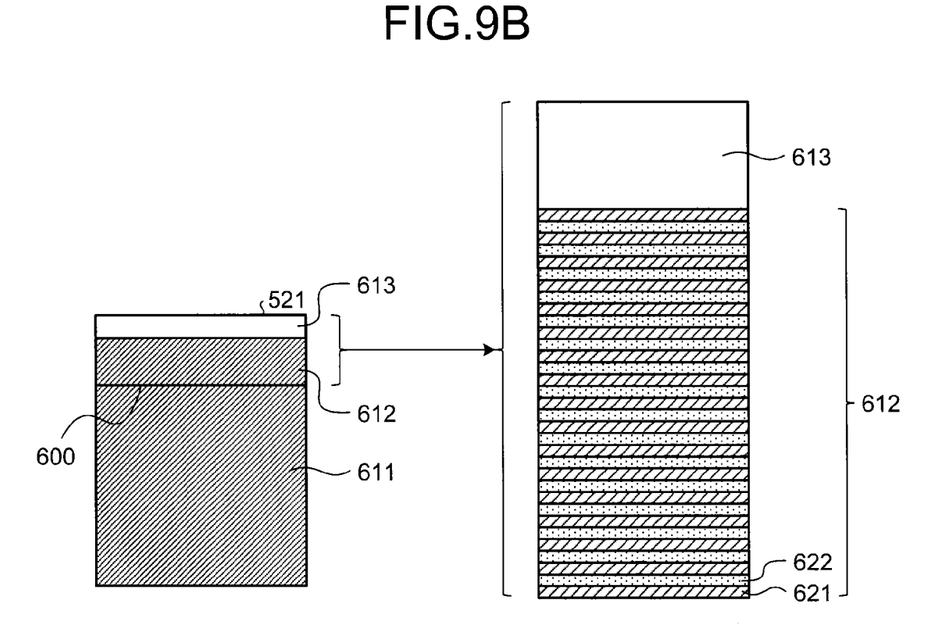
FIG. 9B is a diagram (2) for explaining the discarding unit and the determination unit.

FIG. 9A and FIG. 9B are diagrams for explaining the discarding unit and the determination unit. In the example illustrated in FIGS. 9A and 9B, the counting information is stored in order of detection time from the bottom to the top sequentially in the storage area of the buffer 521. The counting information stored in the buffer 521 is read from the bottom to the top in order, whereby the coincidence counting information is generated.

FIG. 9A illustrates the buffer 521 at a normal counting rate processable by the PET scanner 200 and the console device 500. Note that 600 denotes the threshold, 601 denotes a storage area that stores therein the counting information, and 602 and 603 denote storage areas that store therein no counting information. FIG. 9B illustrates the buffer 521 at a high counting rate higher than the normal counting rate processable by the PET scanner 200 and the console device 500. In the left figure in FIG. 9B, 611 and 612 denote storage areas that store therein the counting information, and 613 denotes a storage area that stores therein no counting information. The right figure in FIG. 9B illustrates a storage area of a section exceeding the threshold of the buffer 521. Note that 621 and 622 each denote storage areas that store therein a counting information group in which the detection time is included in the set duration.

As illustrated in FIG. 9A, if the determination unit 522 determines that the volume does not exceed the threshold 600 at the normal counting rate, the discarding unit 523 discards no counting information from the buffer 521.

By contrast, as illustrated in FIG. 9B, if the determination unit 522 determines that the volume exceeds the threshold 600 at a high counting rate, the discarding unit 523 intermittently discards counting information whose detection time is within the set duration in chronological order among the counting information stored in the buffer 521. The discarding unit 523, for example, discards the counting information group intermittently by using the set duration on a few microsecond time scale. In the example illustrated in the right figure in FIG. 9B, among the counting information stored in the storage area exceeding the threshold in the buffer 521, the discarding unit 523 deletes the counting information group stored in the storage area 621 from the buffer 521, and does not delete the counting information group stored in the storage area 622. The discarding unit 523, for example, deletes all the counting information whose detection time is from "105 microseconds" to "110 microseconds" after the start of detection, and retains the counting information whose detection time is from "111 microseconds" to "116 microseconds" in the buffer 521 without being deleted. The discarding unit 523 then continues the intermittent discarding processing in chronological order until the volume of the counting information stored in the buffer 521 falls below the threshold.

As described above, the counting information stored in the buffer 521 is read sequentially by the coincidence counting information generation unit 524, and is discarded sequentially as the processing is completed. In other words, if the volume of the counting information to be newly stored in the buffer 521 is smaller than the volume of the counting information discarded by the discarding unit 523 and the volume of the counting information read by the coincidence counting information generation unit 524, the volume of the counting information stored in the buffer 521 sequentially decreases and becomes smaller than the threshold.

In the description above, the explanation has been made of the case where the same set duration is used in the selection processing of the counting information group to be discarded and in the selection processing of the counting information group not to be discarded. In the first embodiment, however, the set duration may be different between the selection processing of the counting information group to be discarded and the selection processing of the counting information group not to be discarded. The discarding unit 523, for example, may perform the selection of the counting information group to be discarded by using a "set duration: five microseconds", and perform the selection of the counting information group not to be discarded by using a "set duration: four microseconds".

Furthermore, in the example illustrated in FIG. 9B, the explanation has been made of the case where the counting information is discarded from the storage area 612. Alternatively, the discarding unit 523 may discard the counting information from the storage area 611, and may discard counting information stored in an arbitrary storage area.

Usefulness of the discard processing performed by the discarding unit 523 by using the set duration will now be described. If the counting information overflows from the buffer 521, for example, it is acceptable that the counting information is discarded at random. As described above, when a PET image is reconstructed, the coincidence counting information obtained by the coincidence finding is used as the projection data (sinogram). In other words, only after two pieces of counting information obtained by counting pair annihilation gamma rays are both acquired, the acquired information is used for reconstruction of the PET image.

An explanation will be made of the case where the whole counting information thus collected is represented by "1", "t ($0 \leq t \leq 1$)" is left, and "1−t" is discarded. In such a case, the probability that each of the two pieces of counting information searched as the coincidence counting information is left is "t", and the probability that the two pieces of counting information are both left is "$t^2$". If "t=0.5" is satisfied, for example, the probability of finding the coincidence counting information after the discarding is "0.25" times as likely as the probability of finding the coincidence counting information before the discarding.

By contrast, consideration will be given to the case where a batch of counting information included in the set duration is discarded. In this case, while the counting information within the set duration is discarded, the counting information included in duration other than the set duration, by which the counting information is discarded, is not discarded. Between the two pieces of counting information searched as the coincidence counting information, difference in the detection time is within the time window (10 nanoseconds in the first embodiment). If the set duration is larger duration than the time window, it is unlikely that the counting information group to be discarded by the discarding unit 523 includes one of the two pieces of counting information searched as the coincidence counting information alone. In other words, the probability that the two pieces of counting information searched as the coincidence counting information are both left in the counting information group not to be discarded by the discarding unit 523 is approximately "1". Therefore, the probability of finding the coincidence counting information after the discarding is not different from the probability of finding the coincidence counting information before the discarding.

While the processing is being performed by the determination unit 522 and the discarding unit 523, the coincidence counting information generation unit 524 according to the first embodiment uses the counting information stored in the buffer 521 to generate coincidence counting information. The PET image reconstruction unit 526 according to the first embodiment then uses the coincidence counting information generated from the counting information stored in the buffer 521 while the processing is being performed by the determination unit 522 and the discarding unit 523, and reconstructs a PET image.

As described above, in the first embodiment, the counting information included in the set duration is discarded intermittently in chronological order. As a result, even if the counting information is discarded, it is possible to suppress reduction in the number of pieces of the coincidence counting information compared with the case where the counting information is discarded at random. Accordingly, deterioration in the image quality of the PET image can be suppressed.

Figure 10:
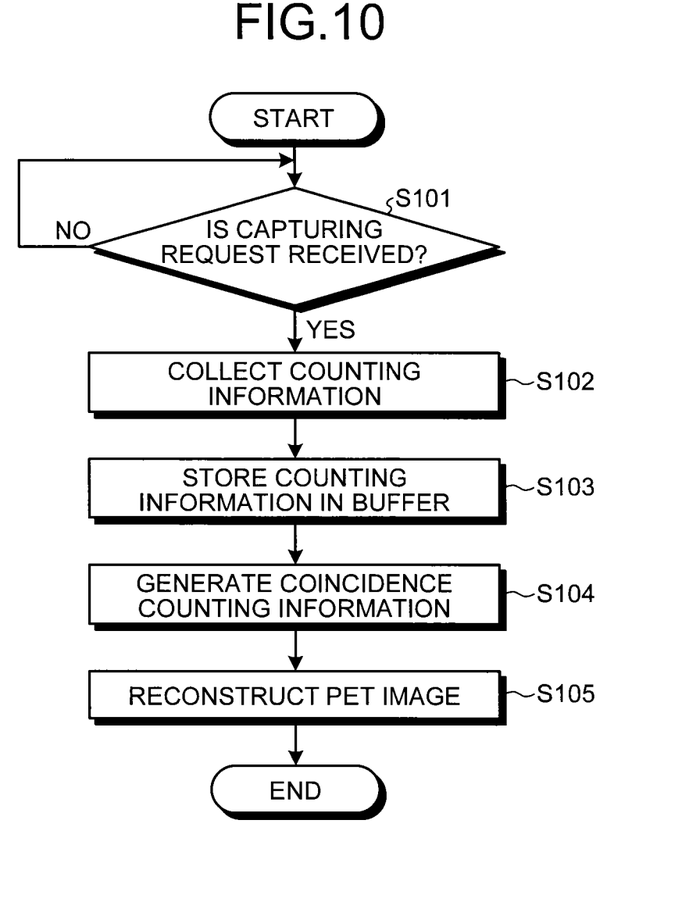
FIG. 10 is a flowchart illustrating an example of a flow of PET image capturing processing performed by the PET-CT apparatus according to the first embodiment.

An example of a flow of PET image capturing processing performed by the PET-CT apparatus 100 according to the first embodiment will now be described with reference to FIG. 10. FIG. 10 is a flowchart illustrating the example of the flow of the PET image capturing processing performed by the PET-CT apparatus according to the first embodiment. Note that the PET-CT apparatus 100 captures an X-ray CT image prior to the series of processing described below.

As illustrated in FIG. 10, in the PET-CT apparatus 100, if a capturing request is received from the user (YES at Step S101), the control unit 540 operates the PET scanner 200, and the PET scanner 200 collects counting information (Step S102). In other words, every time the gamma rays are detected, the PET scanner 200 collects the detection position, the energy value, and the detection time.

The counting information collection unit 520 then receives the counting information collected by the PET scanner 200, and stores the counting information in the buffer 521 (Step S103). Subsequently, the coincidence counting information generation unit 524 refers to the "detection time" in the counting information stored in the buffer 521, and searches for a combination of the counting information whose difference in detection time is within the time window, thereby generating coincidence counting information (Step S104).

The PET image reconstruction unit 526 then reconstructs a PET image by using the coincidence counting information generated by the coincidence counting information generation unit 524 (Step S105).

Figure 11:
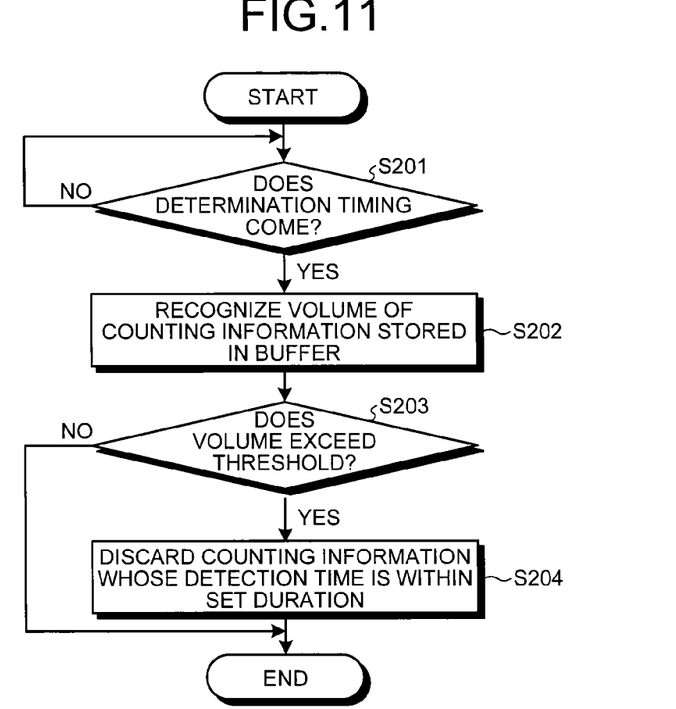
FIG. 11 is a flowchart illustrating an example of a flow of counting information discard processing at a high counting rate performed by the console device according to the first embodiment.

An example of a flow of counting information discard processing at a high counting rate performed by the console device 500 according to the first embodiment will now be described with reference to FIG. 11. FIG. 11 is a flowchart illustrating the example of the flow of the counting information discard processing at a high counting rate performed by the console device according to the first embodiment.

As illustrated in FIG. 11, if an arbitrary determination timing comes (YES at Step S201), the determination unit 522 recognizes the volume of the counting information stored in the buffer 521 (Step S202).

If the determination unit 522 determines that the volume exceeds the threshold (YES at Step S203), the discarding unit 523 intermittently discards counting information whose detection time is within the set duration in chronological order among the counting information stored in the buffer 521 (Step S204), and the processing is terminated. The set duration is longer duration than predetermined duration used for generating the coincidence counting information. Furthermore, the set duration is set to shorter duration than the duration required to collect the counting information for generating the coincidence counting information used for reconstruction of a PET image. By contrast, if the determination unit 522 does not determine that the volume exceeds the threshold (NO at Step S203), the processing is terminated without discarding any counting information.

As described above, in the first embodiment, the counting information collection unit 520 collects counting information including the detection time of gamma rays from the counting results output by the detector 210 that counts light derived from the gamma rays, and stores the counting information in the buffer 521. The determination unit 522 then determines whether the volume of the counting information stored in the buffer 521 exceeds the threshold. If the determination unit 522 determines that the volume exceeds the threshold, the discarding unit 523 intermittently discards, in chronological order, counting information whose detection time is within longer duration than predetermined duration used for generating two pieces of counting information obtained by counting pair annihilation gamma rays nearly coincidentally as coincidence counting information among the counting information collected from the detector 210. In other words, in the method in which the whole counting information thus collected is represented by "1", "t (0≤t≤1)" is left, and "1−t" is discarded at random, the probability that the two pieces of counting information searched as the coincidence counting information are both left is "$t^2$". By contrast, according to the first embodiment, the probability that the two pieces of counting information searched as the coincidence counting information are both left in the counting information group not to be discarded by the discarding unit 523 can be made approximately "1". As a result, it is possible to suppress deterioration in the image quality of the PET image.

Furthermore, in the first embodiment, the duration used for the discard processing performed by the discarding unit 523 is set to shorter duration than the duration required to collect the counting information for generating the coincidence counting information used for reconstruction of a PET image. In other words, in the first embodiment, it is possible to prevent the counting information from being discarded more than necessary, and to ensure that the PET image is reconstructed.

Second Embodiment

Figure 12:
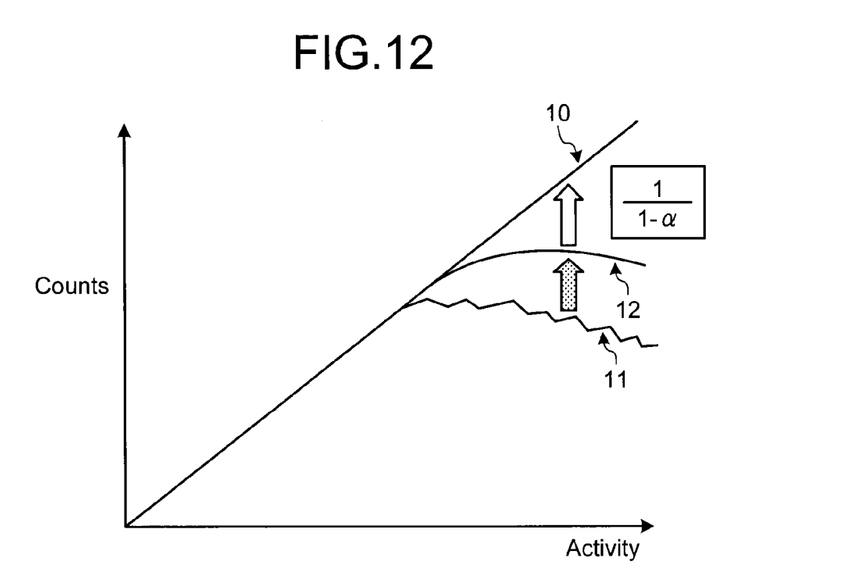
FIG. 12 is a diagram (1) for explaining correction processing performed by a console device according to a second embodiment.
Figure 13:
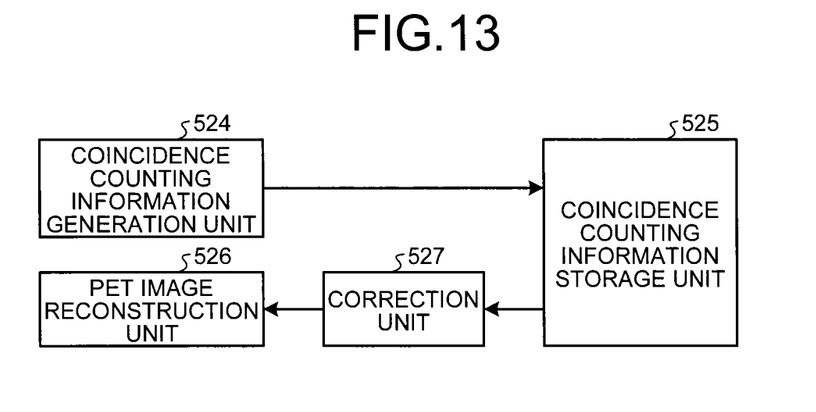
FIG. 13 is a diagram (2) for explaining the correction processing performed by the console device according to the second embodiment.
Figure 14:
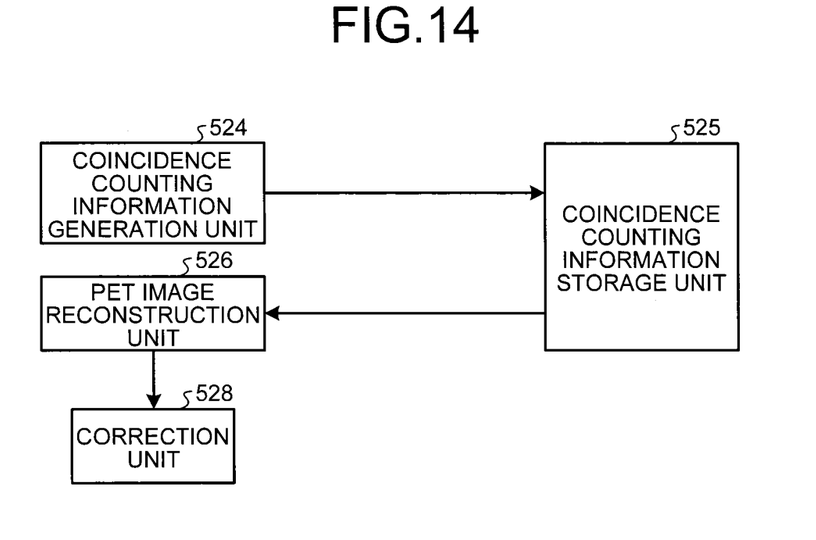
FIG. 14 is a diagram (3) for explaining the correction processing performed by the console device according to the second embodiment.

In a second embodiment, an explanation will be made of the case where the console device 500 performs correction processing by using information related to the discard processing performed by the discarding unit 523 with reference to FIG. 12 to FIG. 14. FIG. 12 to FIG. 14 are diagrams for explaining the correction processing performed by the console device according to the second embodiment.

A doctor refers to a PET image to determine the accumulated amount of an agent modified by the labeled compound in a region of interest (ROI), and conducts imaging diagnosis for the presence of a tumor, for example. The accumulated amount of the agent in the ROI is proportional to a result obtained by coincidentally counting pair annihilation gamma rays emitted from the agent accumulate in the ROI. The result obtained by coincidentally counting pair annihilation gamma rays is herein referred to as "counts". FIG. 12 is a graph in which the horizontal axis represents activity of the labeled compound indicating the accumulated amount of the agent, and the vertical axis represents the counts.

Because there is a proportionality between the activity and the counts, an ideal graph that plots the activity and the counts depicts a straight line 10 having linearity as illustrated in FIG. 12. At the time of high counting, however, the dead time of the detector 210 is lengthened, and data to be processed for generating the counting information is piled up. Furthermore, conventionally, the counting information is discarded from the buffer 521 at random at the time of high counting. Therefore, the counts measured in the conventional PET apparatus drastically declines when the activity becomes higher than a predetermined value, for example, and the degree of the decline in the counts is not constant. As a result, the conventional graph that plots the counts and the activity depicts a jagged line 11 illustrated in FIG. 12, for example.

By contrast, in the first embodiment, the discard processing is controlled such that the counting information whose detection time is within the set duration is discarded intermittently in chronological order. This makes the probability of finding the coincidence counting after the discarding nearly equal to the probability of finding the coincidence counting before the discarding. As a result, in the graph that plots the counts measured in the PET-CT apparatus 100 according to the first embodiment with respect to the activity, the rate of decline in the counts is reduced, and the degree of the decline in the counts becomes smooth compared with the conventional graph. Therefore, in the first embodiment, the graph that plots the counts and the activity depicts a smooth curve 12 illustrated in FIG. 12, for example.

With the control of the discard processing, the PET image reconstructed in the first embodiment is an image that nearly covers pair annihilation events occurring at the time of capturing. When the discard processing is performed, however, the pixel value indicating the accumulated amount in the ROI of the PET image reconstructed in the first embodiment is smaller than the pixel value corresponding to the actual accumulated amount. In other words, while the PET image reconstructed in the first embodiment is an image that qualitatively reflects the accumulated amount of the agent in the ROI, the PET image may not be an image that ensures the quantitativity of the accumulated amount of the agent in the ROI.

However, the rate of "the number of pieces of counting information discarded" to "the total number of pieces of counting information collected at the time of capturing" is already known from the information related to the discard processing performed intermittently in chronological order by the discarding unit 523. In other words, the discard rate of the counting information in the discard processing performed by the discarding unit 523 is a known value.

For example, the total number of pair annihilation events occurring in a single LOR at the time of capturing is represented by "N", and the discard rate is "α (however, 0≤α≤1)". In such a case, on the average, the coincidence counting information generated by the coincidence counting information generation unit 524 in the first embodiment is a result obtained by calculating the number of pair annihilation events occurring in the single LOR at the time of capturing with the expression "N×(1−α)".

Therefore, in order to correct the counting result to a proper counting result, a coefficient of "1/(1−α)" based on the discard rate is used. As a result, it is possible to correct the curve 12 illustrated in FIG. 12 to a straight line having linearity nearly equal to that of the straight line 10.

The console device 500 according to the second embodiment performs first correction processing for correcting the coincidence counting information generated from the counting information stored in the buffer 521 based on the discard rate of the counting information in the discard processing performed by the discarding unit 523. Alternatively, the console device 500 according to the second embodiment performs second correction processing for correcting the PET image reconstructed from the coincidence counting information generated from the counting information stored in the buffer 521 based on the discard rate of the counting information in the discard processing performed by the discarding unit 523.

If the first correction processing is performed, as illustrated in FIG. 13, for example, a correction unit 527 is provided between the coincidence counting information storage unit 525 and the PET image reconstruction unit 526. The coincidence counting information storage unit 525 stores therein the coincidence counting information generated using the counting information acquired from the buffer 521 by the coincidence counting information generation unit 524. The correction unit 527 generates corrected coincidence counting information obtained by correcting the coincidence counting information based on the discard rate. The correction unit 527, for example, multiplies the number of each LOR in the coincidence counting information by the coefficient of "$1/(1-\alpha)$" based on the discard rate, thereby generating the corrected coincidence counting information. The PET image reconstruction unit 526 then reconstructs a PET image by using the corrected coincidence counting information. The correction unit 527 may be provided between the coincidence counting information generation unit 524 and the coincidence counting information storage unit 525. In such a case, the correction unit 527 generates corrected coincidence counting information from the coincidence counting information generated by the coincidence counting information generation unit 524, and stores the corrected coincidence counting information in the coincidence counting information storage unit 525.

If the second correction processing is performed, as illustrated in FIG. 14, for example, a correction unit 528 is provided at a stage subsequent to the PET image reconstruction unit 526. The coincidence counting information storage unit 525 stores therein the coincidence counting information generated using the counting information acquired from the buffer 521 by the coincidence counting information generation unit 524. The PET image reconstruction unit 526 uses the coincidence counting information stored in the coincidence counting information storage unit 525 to reconstruct a PET image.

The correction unit 528 then corrects the PET image reconstructed by the PET image reconstruction unit 526 based on the discard rate. The correction unit 528, for example, multiplies the pixel value of each pixel in the PET image by "$1/(1-\alpha)$", thereby reconstructing a corrected image from the PET image.

Performing the first correction processing or the second correction processing allows the quantitativity of the PET image at the time of high counting to be restored. In other words, it is possible to ensure the quantitativity of the ROI and a peripheral site of the ROI in the PET image.

The correction processing described above is particularly useful in the case where a whole-body examination is performed by using the PET image. In the whole-body examination, for example, a PET image of the subject 402 is captured for a plurality of capturing sites part of which is overlapped with one another while the tabletop 401 is being moved. However, because the accumulated amounts of the agent are different among the capturing sites, if the control of the discard processing described in the first embodiment is carried out, the discard rates are different among the capturing sites. In such case, despite having the same accumulated amount, the pixel values may be different among the PET images. As a result, for example, it may be difficult to compare the accumulated amounts of the agent among the ROIs of different capturing sites by referring to the whole-body PET image obtained by synthesizing the PET images of the capturing sites reconstructed in the first embodiment.

Performing the correction processing based on the discard rate described above allows the quantitativity of the PET image of each capturing site to be restored. In other words, performing the first correction processing or the second correction processing allows the pixel value of the pixel with the same accumulated amount to be approximately equal value among the PET images. As a result, in the second embodiment, for example, it is possible to ensure that the accumulated amounts of the agent among the ROIs of different capturing sites are compared by referring to the whole-body PET image. It is arbitrarily selectable by the operator whether the first correction processing or the second correction processing is performed.

Third Embodiment

Other embodiments may be realized in addition to the first and the second embodiments. In the description below, another embodiment will be explained.

In the first and the second embodiments, for example, the explanation has been made of the case where the determination unit 522 determines the volume of the counting information stored in the buffer 521. However, the first embodiment is not limited thereto. The determination unit 522, for example, may retain a threshold of a free space in the buffer 521 to determine the free space in the buffer 521.

Furthermore, in the first and the second embodiments, for example, the explanation has been made of the case where the discarding unit 523 discards the counting information stored in the buffer 521. However, the first embodiment is not limited thereto. The discarding unit 523, for example, may perform filtering by using the detection time included in the counting information at the stage of reception of the counting information, thereby discarding the counting information. In other words, the discarding unit 523 may discard the counting information prior to being stored in the buffer 521.

Moreover, in the first and the second embodiments, for example, the explanation has been made of the case where the console device 500 receives the counting information from the PET scanner 200 to use the counting information. However, the embodiment is not limited thereto. The console device 500, for example, may receive the counting result obtained by the detector 210 from the PET scanner 200. In this case, the console device 500 receives waveform data output from the PMT 213, and generates the counting information from the waveform data thus received.

Among the processing described in the first and the second embodiments, all or a part of processing explained to be performed automatically may be performed manually, or all or a part of processing explained to be performed manually may be performed automatically by a known method. In addition, the processing process, the control process, the specific names, the information including various types of data and parameters illustrated in the specification and the drawings (FIG. 1 to FIG. 14) can be changed arbitrarily if not otherwise specified.

Each component in each device is illustrated as a functional concept, and is not necessarily to be physically configured as illustrated. In other words, a specific aspect of distribution and integration of each device is not limited to the illustrated aspect, and may be configured by distributing and integrating all or a part thereof functionally or physically in arbitrary units in accordance with various types of loads and usage.

The control method performed by the nuclear medicine imaging apparatus described in the first and the second embodiments can be realized by executing a control program prepared in advance on a computer, such as a personal computer and a work station. Furthermore, the control program may be recorded in a computer-readable recording medium, such as a hard disk, a flexible disk (FD), a CD-ROM, an MO, and a DVD, and be executed by being read from the recording medium by the computer.

As described above, according to the first to the third embodiments, it is possible to suppress deterioration in the image quality of a PET image.

While certain embodiments have been described, these embodiments have been presented by way of examples only, and are not intended to limit the scope of the inventions. Indeed, the novel embodiments described herein may be embodied in a variety of other forms; furthermore, various omissions, substitutions, and changes in the form of the apparatus and method described herein may be made without departing from the spirit of the inventions. The accompanying claims and their equivalents are intended to cover such forms or modifications as would fall within the scope and spirits of the inventions.

What is claimed is:

1. A nuclear medicine imaging apparatus comprising:
   a storing unit configured to collect counting information including detection time of a gamma ray from a counting result output by a detector for counting light derived from a gamma ray, and to store the counting information in a predetermined storage unit;
   a determination unit configured to determine whether a volume of the counting information stored in the predetermined storage unit exceeds a threshold; and
   a discarding unit configured to, in a case where the determination unit determines that the volume exceeds the threshold, intermittently discard, in chronological order, counting information whose detection time is within longer duration than predetermined duration used for generating two pieces of counting information obtained by counting pair annihilation gamma rays nearly coincidentally as coincidence counting information among the counting information collected from the detector.

2. The nuclear medicine imaging apparatus according to claim 1, wherein the duration used for discard processing performed by the discarding unit is shorter duration than duration required to collect counting information for generating coincidence counting information used for reconstruction of a nuclear medicine image.

3. The nuclear medicine imaging apparatus according to claim 1, further comprising a correction unit configured to correct coincidence counting information generated from the counting information stored in the predetermined storage unit or a nuclear medicine image reconstructed from the coincidence counting information based on a discard rate of the counting information in discard processing performed by the discarding unit.

4. A control method comprising:
   collecting, by a storing unit, counting information including detection time of a gamma ray from a counting result output by a detector for counting light derived from a gamma ray, and storing, by the storing unit, the counting information in a predetermined storage unit;
   determining, by a determination unit, whether a volume of the counting information stored in the predetermined storage unit exceeds a threshold; and
   discarding intermittently in chronological order, by a discarding unit, in a case where it is determined that the volume exceeds the threshold at the determining step, counting information whose detection time is within longer duration than predetermined duration used for generating two pieces of counting information obtained by counting pair annihilation gamma rays nearly coincidentally as coincidence counting information among the counting information collected from the detector.

* * * * *